(12) United States Patent
Rozas

(10) Patent No.: US 10,540,283 B2
(45) Date of Patent: Jan. 21, 2020

(54) COHERENCE DE-COUPLING BUFFER

(71) Applicant: Facebook, Inc., Menlo Park, CA (US)

(72) Inventor: Guillermo J. Rozas, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 50 days.

(21) Appl. No.: 15/400,167

(22) Filed: Jan. 6, 2017

(65) Prior Publication Data

US 2017/0116126 A1    Apr. 27, 2017

Related U.S. Application Data

(63) Continuation of application No. 14/295,062, filed on Jun. 3, 2014, now Pat. No. 9,558,116, which is a continuation of application No. 11/102,171, filed on Apr. 7, 2005, now Pat. No. 8,751,753, which is a continuation-in-part of application No. 10/411,168, filed on Apr. 9, 2003, now Pat. No. 7,636,815.

(51) Int. Cl.
| | |
|---|---|
| *G06F 12/0815* | (2016.01) |
| *G06F 12/128* | (2016.01) |
| *G06F 12/0831* | (2016.01) |
| *G06F 12/0808* | (2016.01) |
| *G06F 12/084* | (2016.01) |
| *G06F 12/0817* | (2016.01) |

(52) U.S. Cl.
CPC ........ *G06F 12/0815* (2013.01); *G06F 12/084* (2013.01); *G06F 12/0808* (2013.01); *G06F 12/0831* (2013.01); *G06F 12/128* (2013.01); *G06F 12/0817* (2013.01); *G06F 12/0822* (2013.01); *G06F 2212/1008* (2013.01); *G06F 2212/1021* (2013.01)

(58) Field of Classification Search
CPC ............... G06F 12/128; G06F 12/0817; G06F 12/0815; G06F 12/0831; G06F 12/082; G06F 12/0822; G06F 12/0808
See application file for complete search history.

(56) References Cited

U.S. PATENT DOCUMENTS

| | | |
|---|---|---|
| 5,257,354 A | 10/1993 | Comfort et al. |
| 5,317,718 A | 5/1994 | Jouppi |
| 5,345,576 A | 9/1994 | Lee et al. |
| 5,394,555 A | 2/1995 | Hunter et al. |
| 5,412,787 A | 5/1995 | Forsyth et al. |
| 5,524,212 A | 6/1996 | Somani et al. |
| 5,537,574 A | 7/1996 | Elko et al. |
| 5,623,633 A | 4/1997 | Zeller et al. |

(Continued)

OTHER PUBLICATIONS

Agarwal et al., "The MIT Alewife Machine," Proceedings of the IEEE, vol. 87, No. 3, Mar. 1999, pp. 430-444.

(Continued)

*Primary Examiner* — David Yi
*Assistant Examiner* — Alan Otto
(74) *Attorney, Agent, or Firm* — FisherBroyles, LLP

(57) ABSTRACT

A coherence decoupling buffer. In accordance with a first embodiment, a coherence decoupling buffer is for storing tag information of cache lines evicted from a plurality of cache memories. A coherence decoupling buffer may be free of value information of the plurality of cache memories. A coherence decoupling buffer may also be combined with a coherence memory.

20 Claims, 3 Drawing Sheets

(56) References Cited

U.S. PATENT DOCUMENTS

| | | | |
|---|---|---|---|
| 5,644,753 A | 7/1997 | Ebrahim et al. |
| 5,659,709 A | 8/1997 | Quach |
| 5,704,058 A | 12/1997 | Derrick et al. |
| 5,751,995 A | 5/1998 | Sarangdar |
| 5,761,468 A | 6/1998 | Emberson |
| 5,860,111 A | 1/1999 | Martinez, Jr. et al. |
| 5,897,656 A | 4/1999 | Vogt et al. |
| 5,953,538 A | 9/1999 | Duncan et al. |
| 5,987,571 A | 11/1999 | Shibata et al. |
| 6,088,769 A | 7/2000 | Luick et al. |
| 6,088,771 A | 7/2000 | Steely, Jr. et al. |
| 6,122,714 A | 9/2000 | VanDoren et al. |
| 6,128,701 A | 10/2000 | Malcolm et al. |
| 6,128,702 A | 10/2000 | Saulsbury et al. |
| 6,164,841 A | 12/2000 | Mattson, Jr. et al. |
| 6,167,492 A | 12/2000 | Keller et al. |
| 6,199,152 B1 | 3/2001 | Kelly et al. |
| 6,205,517 B1 | 3/2001 | Sugaya |
| 6,219,745 B1 | 4/2001 | Strongin et al. |
| 6,249,846 B1 | 6/2001 | Van Doren et al. |
| 6,266,743 B1 | 7/2001 | Carpenter et al. |
| 6,279,084 B1 | 8/2001 | Van Doren et al. |
| 6,345,320 B1 | 2/2002 | Kawamata et al. |
| 6,430,657 B1 | 8/2002 | Mittal et al. |
| 6,438,653 B1 | 8/2002 | Akashi et al. |
| 6,446,187 B1 | 9/2002 | Riedlinger et al. |
| 6,535,960 B1 | 3/2003 | Nishida et al. |
| 6,546,464 B2 | 4/2003 | Fortuna et al. |
| 6,594,821 B1 | 7/2003 | Banning et al. |
| 6,633,958 B1 | 10/2003 | Passint et al. |
| 6,638,653 B2 | 10/2003 | Andou et al. |
| 6,662,277 B2 | 12/2003 | Gaither |
| 6,663,945 B2 | 12/2003 | Miyano |
| 6,665,767 B1 | 12/2003 | Comisky et al. |
| 6,668,287 B1 | 12/2003 | Boyle et al. |
| 6,691,306 B1 | 2/2004 | Cohen et al. |
| 6,751,706 B2 | 6/2004 | Chauvel et al. |
| 6,754,782 B2 | 6/2004 | Arimilli et al. |
| 6,754,787 B2 | 6/2004 | Miller et al. |
| 6,785,780 B1 | 8/2004 | Klein et al. |
| 6,795,897 B2 | 9/2004 | Benveniste et al. |
| 6,799,252 B1 | 9/2004 | Bauman |
| 6,868,481 B1 | 3/2005 | Gaither et al. |
| 6,925,536 B2 | 8/2005 | Glasco et al. |
| 7,620,779 B1 | 11/2009 | Klaiber et al. |
| 7,636,815 B1 | 12/2009 | Klaiber et al. |
| 7,937,536 B2 | 5/2011 | Klaiber et al. |
| 7,971,002 B1 | 6/2011 | Rozas et al. |
| 8,751,753 B1 | 6/2014 | Rozas |
| 9,558,116 B2 | 1/2017 | Rozas |
| 2001/0010068 A1 | 7/2001 | Michael et al. |
| 2002/0087778 A1 | 7/2002 | Schoinas |
| 2003/0005234 A1 | 1/2003 | Sperber et al. |
| 2003/0005237 A1 | 1/2003 | Dhong et al. |
| 2003/0131202 A1 | 7/2003 | Khare et al. |
| 2003/0163745 A1 | 8/2003 | Kardach |
| 2004/0003184 A1* | 1/2004 | Safranek | G06F 12/082 711/146 |
| 2006/0123172 A1 | 6/2006 | Herrell et al. |
| 2006/0224829 A1* | 10/2006 | Evrard | G06F 12/0891 711/133 |

OTHER PUBLICATIONS

Handy, Jim, "The Cache Memory Book," Academic Press, 2nd Edition, Jan. 1998, pp. 155-169.
Agarwal et al., "The MIT Alewife Machine," MIT, Jan. 1995, the whole document.
Agarwal et al., "An Evaluation of Directory Schemes for Cache Coherence," ISCA, May 30-Jun. 2, 1988, pp. 280-289.
Jouppi, Norman P., "Improving Direct-Mapped Cache Performance by the Addition of a Small Full Associative Cache and Prefetch Buffers", Proceedings of the 17th Annual International Symposium on Computer Architecture, pp. 364-373.
CPU Cache, From Wikipedia, the free encyclopedia Http://en.wikipedia.org/wiki/CPU, Jan. 1, 2009, pp. 1-18.
Handy, Jim; "The Cache Memory Books", 1998, Academic Press, 2nd Edition, pp. 89-94.
Non Final Office Action, dated Jul. 29, 2010; U.S. Appl. No. 12/624,094.
Restriction Requirement, dated Mar. 28, 2006; U.S. Appl. No. 10/411,168.
Non Final Office Action, dated Sep. 20, 2005; U.S. Appl. No. 10/411,168.
Non Final Office Action, dated Apr. 7, 2008; U.S. Appl. No. 11/439,361.
Notice of Allowance, dated Aug. 26, 2008; U.S. Appl. No. 11/439,361.
Notice of Allowance, dated Dec. 12, 2008; U.S. Appl. No. 11/439,361.
Restriction Requirement, dated Feb. 21, 2008; U.S. Appl. No. 11/439,361.
Non Final Office Action, dated Nov. 1, 2007; U.S. Appl. No. 10/411,168.
Notice of Allowance dated May 23, 2008; U.S. Appl. No. 10/411,168.
Notice of Allowance dated Oct. 30, 2008; U.S. Appl. No. 10/411,168.
Notice of Allowance, dated Aug. 6, 2009; U.S. Appl. No. 10/411,168.
Notice of Allowance dated Jun. 26, 2009; U.S. Appl. No. 11/439,361.
Notice of Allowance dated Mar. 12, 2009; U.S. Appl. No. 11/439,361.
Non Final Office Action, dated Jul. 27, 2006; U.S. Appl. No. 10/411,168.
Notice of Allowance dated Mar. 19, 2009; U.S. Appl. No. 10/411,168.
Notice of Allowance dated Apr. 12, 2007; U.S. Appl. No. 10/411,168.
Final Office Action, dated Feb. 12, 2010; U.S. Appl. No. 11/102,538.
Advisory Action, dated Jun. 11, 2009; U.S. Appl. No. 11/102,538.
Non-Final Office Action, dated Mar. 8, 2007; U.S. Appl. No. 11/102,538.
Final Office Action, dated Sep. 11, 2007; U.S. Appl. No. 11/102,538.
Non-Final Office Action, dated Dec. 12, 2007; U.S. Appl. No. 11/102,538.
Final Office Action, dated Jun. 12, 2008; U.S. Appl. No. 11/102,538.
Non-Final Office Action, dated Dec. 22, 2008; U.S. Appl. No. 11/102,538.
Final Office Action, dated Mar. 23, 2009; U.S. Appl. No. 11/102,538.
Non-Final Office Action, dated Aug. 24, 2009; U.S. Appl. No. 11/102,538.
Non Final Office Action, dated Jun. 23, 2010; U.S. Appl. No. 11/102,538.
Final Rejection, dated Feb. 25, 2009; U.S. Appl. No. 11/102,289.
Final Rejection, dated Sep. 28, 2007; U.S. Appl. No. 11/102,289.
Non Final Office Action, dated Mar. 23, 2007; U.S. Appl. No. 11/102,289.
Non Final Office Action, dated Jun. 12, 2008; U.S. Appl. No. 11/102,289.
Non Final Office Action, dated May 12, 2009; U.S. Appl. No. 11/102,289.
Final Office Action, dated Jan. 27, 2010; U.S. Appl. No. 11/102,289.
Final Office Action received for U.S. Appl. No. 11/102,538 dated Dec. 7, 2010, 24 pages.
Notice of Allowance received for U.S. Appl. No. 11/102,538 dated Feb. 10, 2011, 29 pages.
Notice of Allowance received for U.S. Appl. No. 12/624,094 dated Dec. 23, 2010, 15 pages.
Non-Final Office Action received for U.S. Appl. No. 11/102,171 dated Mar. 26, 2007, 30 pages.
Final Office Action received for U.S. Appl. No. 11/102,171 dated Nov. 26, 2007, 14 pages.
Non-Final Office Action received for U.S. Appl. No. 11/102,171 dated Jul. 9, 2008, 23 pages.
Final Office Action received for U.S. Appl. No. 11/102,171 dated Mar. 16, 2009, 34 pages.
Non-Final Office Action received for U.S. Appl. No. 11/102,171 dated Dec. 2, 2009, 42 pages.
Final Office Action received for U.S. Appl. No. 11/102,171 dated May 10, 2010, 47 pages.
Non-Final Office Action received for U.S. Appl. No. 11/102,171 dated Jul. 19, 2011, 24 pages.
Final Office Action received for U.S. Appl. No. 11/102,171 dated Dec. 21, 2011, 24 pages.

(56) References Cited

OTHER PUBLICATIONS

Non-Final Office Action received for U.S. Appl. No. 11/102,171 dated Jun. 14, 2012, 26 pages.
Final Office Action received for U.S. Appl. No. 11/102,171 dated Nov. 30, 2012, 38 pages.
Notice of Allowance received for U.S. Appl. No. 11/102,171 dated Jan. 15, 2014, 23 pages.
Non-Final Office Action received for U.S. Appl. No. 14/295,062 dated Jan. 30, 2015, 37 pages.
Final Office Action received for U.S. Appl. No. 14/295,062 dated Jun. 17, 2015, 25 pages.
Non-Final Office Action received for U.S. Appl. No. 14/295,062 dated Oct. 13, 2015, 29 pages.
Final Office Action received for U.S. Appl. No. 14/295,062 dated Apr. 18, 2016, 35 pages.
Notice of Allowance received for U.S. Appl. No. 14/295,062 dated Sep. 16, 2016, 24 pages.

* cited by examiner

COHERENCE DE-COUPLING BUFFER

CROSS-REFERENCE TO RELATED APPLICATIONS

This application is a Continuation of and claims priority to U.S. patent application Ser. No. 14/295,062, filed on Jun. 3, 2014, which is a Continuation of and claims priority to U.S. patent application Ser. No. 11/102,171, filed on Apr. 7, 2005, and now issued as U.S. Pat. No. 8,751,753, which is a Continuation-In-Part of and claims priority to U.S. patent application Ser. No. 10/411,168, filed on Apr. 9, 2003, and now issued as U.S. Pat. No. 7,636,815, which are hereby incorporated by reference in their entirety.

This application is related to U.S. patent application Ser. No. 11/102,289, filed on Apr. 7, 2005, which is hereby incorporated by reference in its entirety.

FIELD

Embodiments relate to cache coherency in multi-processor computer systems.

BACKGROUND

Shared-memory computer systems comprising multiple caching agents, e.g., processors, typically employ cache coherence protocols in order to implement a memory consistency model such as sequential consistency or total store ordering consistency. Such protocols typically involve "snooping" the caches of other agents, e.g., other processors, prior to a given processor changing the state of one of its own cache lines. This "snooping," also known as coherence traffic, can be quite onerous for a multi-agent system and impose deleterious loading on cache memory bandwidth among agents of such a multi-agent system.

SUMMARY

Conventional cache coherency protocols operating on conventional computer systems are frequently wasteful in that typically there is little or no conflicting, e.g., mutually exclusive, sharing of data. Consequently, most cache "snoops" do not result in a requirement to change cache lines. Typically even when there is sharing of data among several agents, that sharing is read-only in nature and does not require modification of cache lines. Therefore, systems and methods of coherence decoupling buffers for multi-agent computer systems are highly desired.

Accordingly, a coherence decoupling buffer is disclosed. In accordance with a first embodiment, a coherence decoupling buffer is for storing tag information of cache lines evicted from a plurality of cache memories. A coherence decoupling buffer may be free of value information of the plurality of cache memories.

In accordance with another embodiment, a coherence decoupling buffer does not contain value information of the plurality of cache memories.

In accordance with still another embodiment, a computer system comprises a main memory and a plurality of cache memories. The cache memories comprise a plurality of cache lines and each cache line comprises a tag and corresponding value information. A coherence decoupling buffer is coupled to the main memory and to the plurality of cache memories. The coherence decoupling buffer comprises a plurality of tags of cache lines evicted from the plurality of cache memories.

In accordance with still another embodiment, a method of managing coherence among caches is disclosed. It is determined if a tag of a snooped cache line is present in a coherence decoupling buffer. Access to the cache line is granted responsive to a presence of the tag In accordance with still yet another embodiment, a computer system comprises a main memory and a plurality of cache memories. The cache memories comprise a plurality of cache lines and each cache line comprises a tag and corresponding value information. The computer system additionally comprises a coherence memory coupled to the main memory comprising a plurality of tags corresponding to the plurality of cache lines. Further, the computer system comprises a coherence decoupling buffer coupled to the coherence memory and to the plurality of cache memories wherein the coherence decoupling buffer comprises a plurality of tags of cache lines evicted from the plurality of cache memories.

BRIEF DESCRIPTION OF THE DRAWINGS

The accompanying drawings, which are incorporated in and form a part of this specification, illustrate embodiments, together with the description, serve to explain the principles of the disclosure.

DETAILED DESCRIPTION

Figure 1:
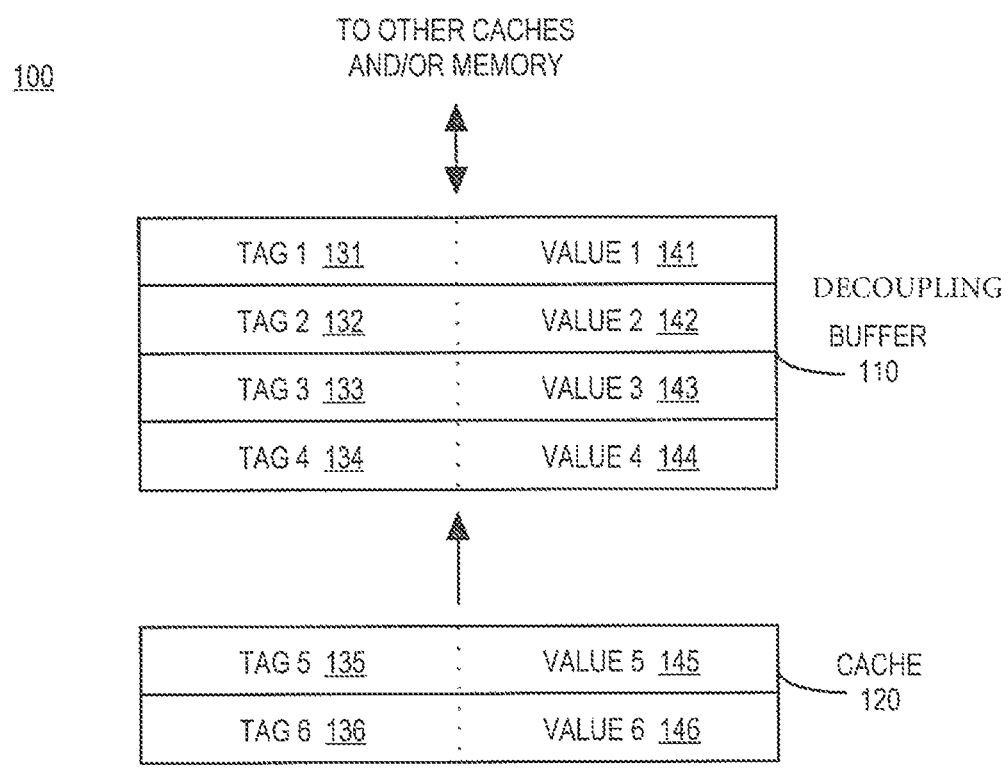
FIG. 1 illustrates a block diagram of an exemplary caching system, in accordance with embodiments.

Reference will now be made in detail to embodiments, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Coherence Decoupling Buffer

Embodiments are described in the context of design and operation of integrated semiconductors. More particularly, embodiments relate to a coherence decoupling buffer. It is appreciated, however, that elements of the disclosure may be utilized in other areas of semiconductor design and operation.

The term "cache" is generally understood to refer to or to describe a collection of data or a data structure duplicating values stored elsewhere, for example, duplicating values stored in main memory of a computer system. Once the data are stored in a cache, the data can be used by accessing the copy stored in a cache rather than accessing the original data. Typically, access times to cache memory are much faster than access times to main memory. Consequently, cache accesses are much faster and contribute to increased performance in comparison to accesses to main memory. However, cache memory is typically orders of magnitude more expensive, on a per bit basis, than main memory. Therefore, complex engineering trade-offs are utilized to determine an advantageous amount of cache memory.

A cache memory is generally organized as a group of cache "lines." A cache line typically comprises a "tag," e.g., of 32 bits, and a "value," e.g., of 1024 bits, for example. The value portion of a cache line typically comprises a copy of information stored (or to be stored) in main memory. The tag portion of a cache line generally identifies a mapping of the cache line value to a portion of main memory. For example, the tag generally comprises the main memory address corresponding to the cache line value. It is appreciated that tags often comprise other information related to the cache line in addition to the address.

Due to the performance advantages of caching, most modern processors, including, e.g., microprocessors, comprise caches, for example, instruction and data caches. Many computer systems also utilize multiple caching agents including multiple cached processors and/or non-processor agents, e.g., caching direct memory access (DMA) agents.

Shared-memory multi-agent computer systems typically employ cache coherence protocols in order to implement a memory consistency model such as sequential consistency or total store ordering consistency.

The term "snoop" is generally understood to refer to or to describe a message from an agent, e.g., a CPU, regarding a status of cache lines.

Conventional cache coherency protocols operating on conventional computer systems are frequently wasteful in that typically there is little or no conflicting, e.g., mutually exclusive, sharing of data. Consequently, most cache snoops do not result in a requirement to change cache lines. Typically even when there is sharing of data among several agents, that sharing is of a read-only nature that does not require changing cache lines. Therefore, systems and methods of coherence decoupling buffers are highly desired.

One such well-known consistency protocol is known or referred to by the initials of its states, MESI. MESI, or Modified, Exclusive, Shared, Invalid, describes a sequence of states and state transitions applied to information in a cache to ensure the integrity of information stored in other CPU caches and main memory. For example, MESI data can be encoded into two bits stored within a cache tag. Such cache status information is sometimes referred to as cache "permissions."

A common condition for data in a cache is to be in the "Shared" state. In the shared state, the cache line contents correspond to main memory and may be shared among all agents.

Prior to being modified by an agent, a cache line is typically marked as being "Exclusive" to a particular cache.

If a CPU (or other agent) modifies information in a cache, the modified lines are marked as "Modified." This indicates that the underlying data, e.g. contained in the main memory, is no longer valid. As other agents learn of this status, e.g., via snooping or inquiry, such agents know not to utilize main memory or their cache copy, if any, corresponding to the modified cache contents.

Responsive to determining that a cache line has been marked modified or exclusive by an agent, other agents typically mark corresponding cache lines as "Invalid," indicating that their copies of an invalid cache line should not be utilized.

State changes among multiple caches can cause the various agents, e.g., CPUs, to perform numerous operations. For example, responsive to a cache line state change, partially complete operation sequences in a CPU may need to be rolled back, cache lines may need to be evicted, CPUs or other agents may need to suspend main operations in order to search their own caches to determine if such caches contain affected cache lines. Such operations to maintain cache coherency are considered a "necessary evil." For example, such operations are conventionally required to maintain cache coherency. However, those same operations are deleterious in that the main operation of an agent, e.g., executing software instructions, does not make progress, and in some cases even regresses, while such cache coherency tasks are completed.

It is appreciated that embodiments are well suited to any hierarchical arrangement of caches within a caching agent. For example, caches internal to a caching agent may be inclusive, exclusive or neither.

It is to be appreciated that embodiments are well suited to other cache coherency models.

A computer system comprising multiple caches that utilizes inclusion, e.g., among multiple levels of cache or via a coherence memory, to filter out cache snoops that do not need to be propagated to the included cache(s) still needs to propagate some snoops.

For example, a remote snoop that results in a cache hit and requires a state change will force a snoop to the included cache(s). For example, a shared access to a cache line that is marked exclusive and dirty, or an exclusive and dirty access to a shared cache line, will force a snoop. It is generally desirable for such snoops to take place in a timely manner as the remote (snooping) agent is waiting for the local agent to perform the required actions, e.g., to invalidate local copies of a cache line.

A second type of required snoop occurs in response to an inclusive cache or coherence memory removing or evicting a cache line, for example because the cache needs space for a newly required line. In contrast to the previous case, however, these snoops can be delayed as no external agent is waiting on them.

In accordance with embodiments, a decoupling buffer is added at a layer "above," e.g., at a hierarchical level higher than, a plurality of included cache(s). Such a decoupling buffer can limit performance degradation due to snoops of this second type, allowing amortization and batching of such snoops.

FIG. 1 illustrates a block diagram of an exemplary caching system 100, in accordance with embodiments. Caching system 100 comprises a cache 120 of well-known design. Cache 120 is inclusive of any other caches (not shown) within system 100. Cache 120 comprises two cache lines (read horizontally in FIG. 1), each cache line comprising tag and value information. For example, tag5 135 comprises identification and status information corresponding to value5 145. The identification information is generally a mapping of the cache line to and address in main memory. The status information generally comprises permission bits and other indicators of allowed usage of the cache line. Cache 120 is illustrated as comprising a second cache line, comprising tag6 136 and value6 146.

Caching system 100 further comprises a coherence decoupling buffer 110, in accordance with embodiments. Coherence decoupling buffer 110 comprises permission information for cache lines that have been evicted from cache 120. It is appreciated that coherence decoupling buffer 110 may optionally comprise additional information related to a cache line, for example, a full tag and/or the value portion of a cache line, in accordance with embodiments.

It is to be appreciated that a coherence decoupling buffer that does not store cache line value information can comprise permission bits for multiple cache lines, thereby making the coherence decoupling buffer effectively larger, e.g., mapping a greater number of evicted cache lines.

Coherence decoupling buffer 110 is illustrated as a first in, first out (FIFO) buffer, although it is to be appreciated that embodiments are well suited to other types of buffers, e.g., a stack or dequeue.

Coherence decoupling buffer 110 is coupled to cache 120. It is to be appreciated that embodiments are well suited to a wide variety of numbers and logical arrangements of caches coupled to coherence decoupling buffer 110. For example, a coherence decoupling buffer is well suited to a caching system in which cache 120 includes, or is inclusive of, multiple caches. Further, a coherence decoupling buffer is well suited to a caching system in which multiple caches are inclusive, exclusive, neither inclusive nor exclusive, or various combinations of such relations.

In response to evicting a cache line from an inclusive cache, e.g., cache 120, the cache line is inserted into coherence decoupling buffer 110. It is appreciated that coherence decoupling buffer 110 is not "inclusive" in a formal caching sense, as coherence decoupling buffer 110 does not contain information currently in cache 120. However, from another perspective, coherence decoupling buffer 110 may be considered inclusive, as it comprises information evicted from an associated inclusive cache.

For example, tag1 131 of coherence decoupling buffer 110 was at one time contained in cache 120. At some point in the past, tag1 131 and its associated value, value1 141, were evicted from cache 120. Similarly, tag2 132, value2 142, tag3 133, value3 143, tag4 134 and value4 144 were all at one time in a cache "below" coherence decoupling buffer 110, e.g., cache 120.

When a remote snoop arrives at the agent comprising coherence decoupling buffer 110, coherence decoupling buffer 110 is examined.

It is appreciated that a remote snoop that hits in the inclusive cache(s) will miss in coherence decoupling buffer 110, as coherence decoupling buffer 110 is filled with cache lines evicted from the inclusive cache. Such a remote snoop hit should be propagated to the inclusive cache(s), e.g., cache 120, in a timely manner. The snoop can either bypass coherence decoupling buffer 110, or it can be inserted in the coherence decoupling buffer 110, subsequently forcing prior pending entries to drain.

A local access that misses in the inclusive cache should look in the coherence decoupling buffer 110. If the access hits within coherence decoupling buffer 110, the entry can be re-inserted into the inclusive cache (assuming that the permissions are compatible) and the entry can be removed from coherence decoupling buffer 110.

It is appreciated that coherence decoupling buffer 110 is well suited to comprising cache line value information. Alternatively, coherence decoupling buffer 110 can be limited to holding only permissions.

Figure 2:
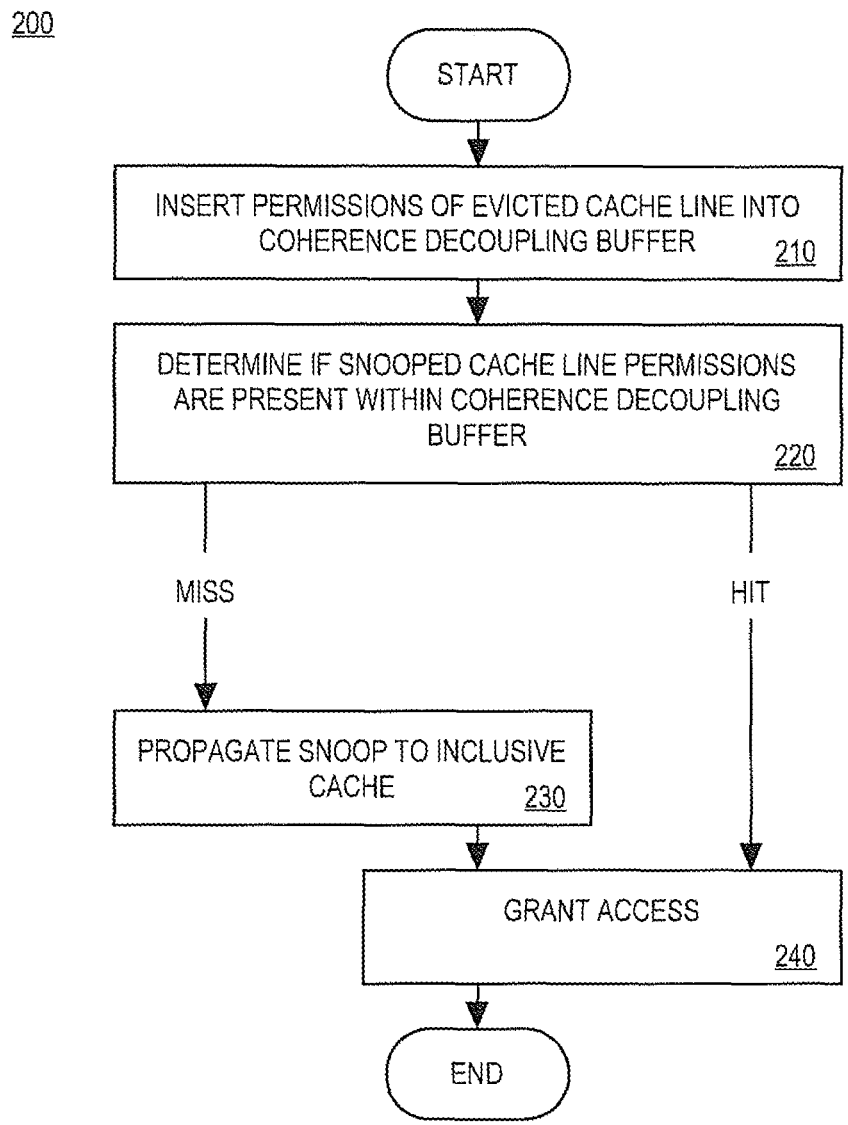
FIG. 2 illustrates an exemplary method of managing coherence among caches, in accordance with embodiments.

FIG. 2 illustrates an exemplary method 200 of managing coherence among caches, in accordance with embodiments. In optional 210, permissions of an evicted cache line are inserted into a coherence decoupling buffer.

In 220, it is determined if permissions of a snooped cache line are present within the coherence decoupling buffer, for example coherence decoupling buffer 110 of FIG. 1. If the permissions of the snooped cache line are not present in the coherence decoupling buffer, the snoop is a miss of the coherence decoupling buffer. It is appreciated, however, that the snoop is not necessarily a miss of the inclusive cache, as the coherence decoupling buffer does not reflect the present contents of the inclusive cache. Consequently, flow of method 200 continues at 230 and the snoop is propagated to the inclusive cache.

If the permissions of the snooped cache line are present in the coherence decoupling buffer, the snoop is a hit of the coherence decoupling buffer. It is appreciated, however, that the snoop is a miss of the inclusive cache, as the coherence decoupling buffer indicates cache lines that are not, e.g., no longer, in the inclusive cache. Consequently, since the cache line is not present in the inclusive cache, the snoop is of no consequence to contents of the inclusive cache and flow of method passes to 240.

In 230, the snoop is propagated to the inclusive cache for processing in accordance with well-known cache coherency protocols. Ultimately, flow passes to 240.

In 240, access to the cache line is granted.

In this novel manner, neither a cache covered by a coherence decoupling buffer nor an associated caching agent are disturbed by cache snoops for recently evicted cache lines. In many cases, this results in increased performance as many snoops are of a read only variety, and do not require cache changes.

In accordance with embodiments, a coherence decoupling buffer can be advantageously combined with a coherence memory. Coherence memory is disclosed in U.S. patent application Ser. No. 11/102,289, filed on Apr. 7, 2005, which is incorporated herein by reference in its entirety.

Figure 3:
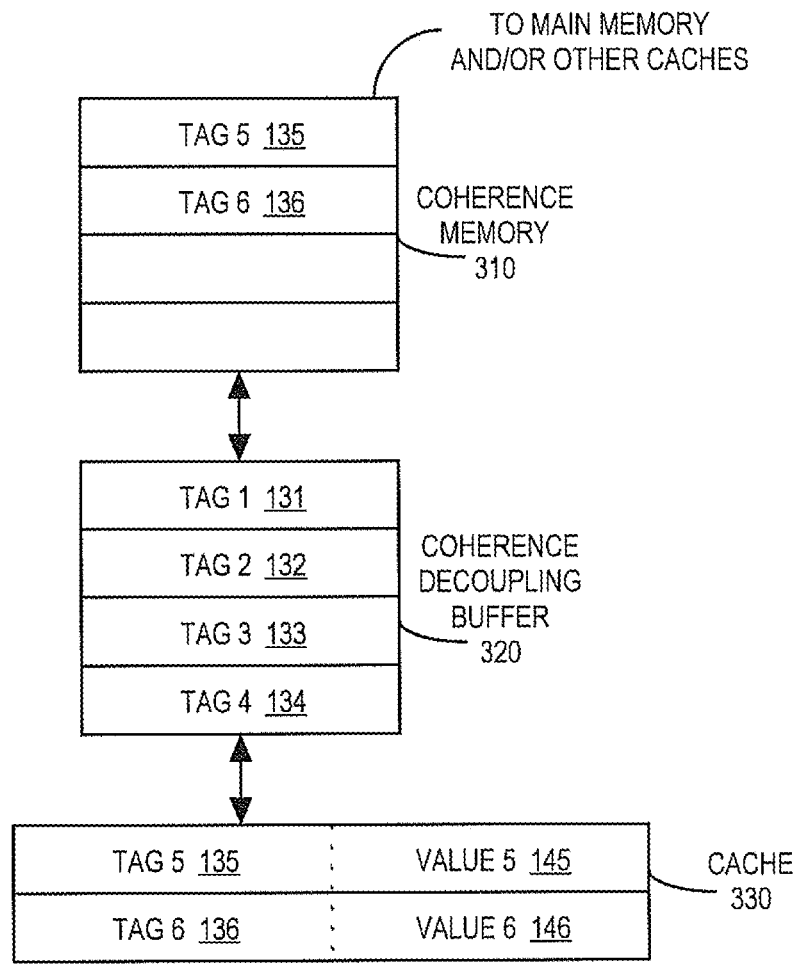
FIG. 3 illustrates a caching system comprising a coherence decoupling buffer and a coherence memory, in accordance with embodiments.

FIG. 3 illustrates a caching system 300 comprising a coherence decoupling buffer and a coherence memory, in accordance with embodiments.

Coherence memory 310 is generally at the top of a caching agent structural hierarchy. Coherence memory is generally coupled to a main memory and other caching agents. Cache 330 is of well-known cache design and operation. Coherence decoupling buffer is coupled between cache 330 and coherence memory 310.

Coherence memory 310 comprises tag information for all included cache(s), e.g., for cache 330. Consequently, coherence memory 310 comprises tag5 135 and tag6 136, corresponding to the contents of cache 330.

As described previously with respect to FIG. 2, coherence decoupling buffer 320 comprises tag information of cache lines that have been evicted from inclusive cache(s), e.g., from cache 330. Coherence decoupling buffer 320 comprises tag1 131, tag2 132, tag3 133, and tag4 134.

In accordance with an embodiment, this novel coupling of a coherence memory with a coherence decoupling buffer can result in advantageously increased cache performance, as read-only snoops to cache lines contained within the included cache(s) are filtered by a coherence memory. Further snoops to an additional set of cache lines that are known not to be within the included cache(s), e.g., have been evicted from such caches, are filtered by a coherence decoupling buffer. Such filtered or blocked snoops do not degrade the main performance of the caching agent, as such snoops generally do in the absence of embodiments of the disclosure.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A method comprising: receiving a communication from a remote source to a local caching agent that is configured to interact with a local cache memory; initiating a responsive action to the communication by using a coherence memory and a coherence decoupling buffer, which are each configured to filter different types of communications from the remote source to the local caching agent, the coherence decoupling buffer being configured to filter queries to cache lines that are known not to be included within the local cache memory, and the coherence memory being configured to filter read-only queries for cache lines that are already contained within the local cache memory, preventing such read-only queries from being sent to the local cache memory; and upon determining that communication from the remote source to the local caching agent was unfiltered by the coherence decoupling buffer and the coherence memory, propagating the communication to the local caching agent to perform the responsive acting in the local cache memory.

2. The method of claim 1, wherein the communication comprises status information of a cache line including a cache line tag comprising the status information.

3. The method of claim 2, wherein the status information comprises permission information associated with a cache coherence protocol.

4. The method of claim 3, wherein the cache coherence protocol comprises MESI (Modified, Exclusive, Shared, Invalid).

5. The method of claim 2, wherein said initiating a responsive action to the communication comprises:
   determining whether first cache line tag content of the coherence memory includes the cache line tag;
   if the cache line tag is not in the coherence memory, determining whether second cache line tag content of the coherence decoupling buffer includes the cache line tag; and
   if the coherence memory or the coherence decoupling buffer includes the cache line tag and is sufficient for the responsive action, completing the responsive action to the communication.

6. The method of claim 5, wherein the first cache line tag content of the coherence memory comprises cache line tags stored in at least one local cache memory associated with the local caching agent.

7. The method of claim 6, wherein the second cache line tag content of the coherence decoupling buffer comprises evicted cache line tags of cache lines evicted from the at least one local cache memory in response to unavailability of space for a new cache line in the at least one local cache memory.

8. A method comprising: receiving a cache line status message from a remote source to a local caching agent, the local caching agent being configured to interact with a local cache memory; initiating a responsive action to the cache line status message by using cache line tag content associated with the local caching agent and stored in a coherence memory and a coherence decoupling buffer, wherein the coherence memory and the coherence decoupling buffer are each configured to filter different types of cache line status messages from the remote source to the local caching agent, the coherence decoupling buffer being configured to filter queries to cache lines that are known not to be included within the local cache memory, and the coherence memory being configured to filter read-only queries for cache lines that are already contained within the local cache memory, preventing such read-only queries from being sent to the local cache memory; and upon determining that at least one of the cache line status messages from the remote source to the local caching agent was not filtered by the coherence decoupling buffer and the coherence memory, propagating the cache line status message to the local caching agent to perform the responsive action in the local cache memory.

9. The method of claim 8, wherein the cache line status message comprises status information of a cache line including a cache line tag comprising the status information.

10. The method of claim 9, wherein the status information comprises permission information associated with a cache coherence protocol.

11. The method of claim 10, wherein the cache coherence protocol comprises MESI (Modified, Exclusive, Shared, Invalid).

12. The method of claim 9, wherein said initiating a responsive action to the cache line status message comprises:
   determining whether the cache line tag content stored in the coherence memory includes the cache line tag;
   if the cache line tag is not stored in the coherence memory, determining whether the cache line tag content stored in the coherence decoupling buffer includes the cache line tag; and
   if the coherence memory or the coherence decoupling buffer stores the cache line tag and is sufficient for the responsive action, completing the responsive action to the cache line status message.

13. The method of claim 12, wherein the cache line tag content stored in the coherence memory comprises cache line tags stored in at least one local cache memory associated with the local caching agent.

14. The method of claim 13, wherein the cache line tag content stored in the coherence decoupling buffer comprises evicted cache line tags of cache lines evicted from the at least one local cache memory in response to unavailability of space for a new cache line in the at least one local cache memory.

15. A method comprising:
   receiving a remote snoop from a remote source to a local caching agent that is configured to interact with a local cache memory;
   initiating a responsive action to the remote snoop by using first cache line tag content associated with the local caching agent and stored in a coherence memory;
   if the first cache line tag content stored in the coherence memory is insufficient for the responsive action, using second cache line tag content associated with the local caching agent and stored in a coherence decoupling buffer for the responsive action, wherein the coherence memory and the coherence decoupling buffer are each configured to filter different types of remote snoops from the remote source to the local caching agent, the coherence decoupling buffer being configured to filter queries to cache lines that are known not to be included within the local cache memory, and the coherence memory being configured to filter read-only queries for cache lines that are already contained within the local cache memory, preventing such read-only queries from being sent to the local cache memory; and
   upon determining that the remote snoop from the remote source to the local caching agent was unfiltered by the coherence decoupling buffer and the coherence memory, propagating the remote snoop to the local caching agent to perform the responsive action in the local cache memory.

16. The method of claim 15, wherein the remote snoop comprises status information of a cache line including a cache line tag comprising the status information.

17. The method of claim 16, wherein the status information comprises permission information associated with a cache coherence protocol.

18. The method of claim 17, wherein the cache coherence protocol comprises MESI (Modified, Exclusive, Shared, Invalid).

19. The method of claim 16, further comprising:
if the coherence memory or the coherence decoupling buffer stores the cache line tag and is sufficient for the responsive action, completing the responsive action to the remote snoop.

20. The method of claim 15, wherein the first cache line tag content stored in the coherence memory comprises cache line tags stored in at least one local cache memory associated with the local caching agent, and wherein the second cache line tag content stored in the coherence decoupling buffer comprises evicted cache line tags of cache lines evicted from the at least one local cache memory in response to unavailability of space for a new cache line in the at least one local cache memory.

* * * * *

UNITED STATES PATENT AND TRADEMARK OFFICE
CERTIFICATE OF CORRECTION

PATENT NO. : 10,540,283 B2  
APPLICATION NO. : 15/400167  
DATED : January 21, 2020  
INVENTOR(S) : Guillermo J. Rozas Page 1 of 1

It is certified that error appears in the above-identified patent and that said Letters Patent is hereby corrected as shown below:

In the Claims

In Column 7, Line 20, Claim 1, delete "that" and insert -- that the --, therefor.

In Column 7, Line 24, Claim 1, delete "acting" and insert -- action --, therefor.

Signed and Sealed this  
Third Day of March, 2020

Andrei Iancu  
*Director of the United States Patent and Trademark Office*